United States Patent [19]

Wollner

[11] Patent Number: 5,962,074
[45] Date of Patent: Oct. 5, 1999

[54] WAX COMPOSITION AND METHOD OF USE

[75] Inventor: Mark R. Wollner, Woodbury, Minn.

[73] Assignee: 3M Innovative Properties Company, St. Paul, Minn.

[21] Appl. No.: 08/658,770

[22] Filed: Jun. 5, 1996

[51] Int. Cl.$^6$ ...................................................... B05D 3/04
[52] U.S. Cl. .......................... 427/322; 427/355; 427/371; 427/388.4; 427/388.5; 427/389.8; 427/393.5; 427/358; 524/268; 524/275; 524/276; 524/277; 524/278; 524/475; 524/478; 524/488; 524/480; 524/487; 524/544
[58] Field of Search .................................... 524/544, 268, 524/275, 276, 277, 278, 475, 478, 488, 480, 487; 427/322, 355, 371, 388.4, 388.5, 389.8, 393.5, 358

[56] References Cited

U.S. PATENT DOCUMENTS

| | | | |
|---|---|---|---|
| Re. 24,906 | 12/1960 | Ulrich | 206/59 |
| 2,839,482 | 6/1958 | Geen et al. | 524/277 |
| 3,786,116 | 1/1974 | Milkovich et al. | 260/885 |
| 3,842,059 | 10/1974 | Milkovich et al. | 260/93.5 A |
| 4,404,035 | 9/1983 | Ona et al. | 106/271 |
| 4,462,828 | 7/1984 | Otsuki | 524/773 |
| 4,594,109 | 6/1986 | Kawabata | 524/277 |
| 4,963,432 | 10/1990 | Fuggini et al. | 524/267 |
| 4,972,037 | 11/1990 | Garbe et al. | 526/245 |
| 5,017,222 | 5/1991 | Cifuentes et al. | 106/272 |
| 5,085,695 | 2/1992 | Randen et al. | 106/8 |
| 5,209,924 | 5/1993 | Garbe et al. | 424/71 |
| 5,258,063 | 11/1993 | Cifuentes et al. | 106/3 |
| 5,326,387 | 7/1994 | Faber et al. | 106/3 |
| 5,425,804 | 6/1995 | Shinohara et al. | 524/277 |
| 5,514,493 | 5/1996 | Waddell et al. | 429/199 |

FOREIGN PATENT DOCUMENTS

| | | | |
|---|---|---|---|
| 584484 | 10/1959 | Canada | 524/277 |
| 03227383 | 10/1991 | Japan . | |
| 04202389 | 7/1992 | Japan . | |
| 346438 | 4/1931 | United Kingdom | 524/277 |

OTHER PUBLICATIONS

Kawakami et al., "Silicone Macromers for Graft Polymer Synthesis," Polymer Journal, vol. 14, No. 11. pp. 913–917 (1982).

Kawakami et al., "Synthesis and Copolymerization of Polysiloxane Macromers," ACS Polymer Preprints 25(1), pp. 245–246 (1984).

Kawakami et al., "Synthesis of silicone graft polymers and a study of their surface active properties," Markromolecular Chemie, vol. 185, No. 9, pp. 9–18 (1984).

Noshay et al., "Block Copolymers, Overview and Critical Survey," Academic Press, pp. 7–17, (1977).

*Primary Examiner*—Judy M. Reddick
*Attorney, Agent, or Firm*—Daniel C. Schulte

[57] ABSTRACT

A wax composition comprising a wax component and a copolymer. The copolymer comprises a backbone, a pendant aliphatic group, a pendant fluorinated group, and a pendant polydiorganosiloxane group. Also, a wax composition comprising a silicone fluid, solvent, and an alkoxylated wax component, the alkoxylated wax component comprising one or poly(alkoxy) groups attached to the wax component at a free alcohol group, a free acid group, or an olefinic group.

18 Claims, No Drawings

WAX COMPOSITION AND METHOD OF USE

FIELD OF THE INVENTION

This invention relates to the field of wax compositions, specifically compositions capable of imparting durable, high-luster finishes to painted surfaces.

BACKGROUND

Car owners have a long-standing desired to provide their automobiles with a beautiful, shiny appearance, and to protect the underlying paint from environmental damage such as mud, water spots, and the effects of the sun. Over the years, car owners have come to prefer paste waxes to protect and beautify the exterior painted surfaces of their vehicles because wax finishes are typically more durable than finishes provided by wax-free products. One reason for their durability is that waxes provide harder coatings than greases or oils. Because of their superior hardness, waxes do not thin out when polished to a high-gloss sheen by rubbing with a polishing cloth.

During the 1950's, silicone-polymer-containing liquid emulsions supplanted paste waxes as vehicle polishes in the consumer market because these emulsions are generally easier to apply to a car's finish, contained "built-in" road tar removers, and could be polished with less effort. However, those consumers who are more serious about the appearance of their car's finish (i.e., aficionados), and who restore vintage automobiles, continue to believe that higher gloss and durable finishes can only be achieved with paste waxes. These aficionados, as well as a broader class of specialty auto finish consumers, perceive paste wax finishes as being hard and durable and conversely perceive emulsion based finishes as being soft, and easily removed. Furthermore, the specialty market is concerned with other properties of paste wax, for example the subjective feel or "hand" of wax as it is spread out on a painted surface. If the wax is too soft or contains too much non-volatile solvent, the wax can be "smeary" and slow drying. Conversely, if the wax is too hard, it can be difficult to "rub-out." Thus, there exists a need for a wax composition having desired physical properties including durability, ease of application, and stain resistance.

Wax compositions should also be amenable to efficient manufacturing processes. Generally, paste wax compositions exist in a solid or semi-solid state at room temperature, and must be heated to a liquid state in order to pour the material into a packaging container. Many paste wax compositions have been made of chemical components that when combined in a liquid state, will separate into two phases. After heating the composition and pouring into a packaging container, these compositions would phase separate before solidifying. As a result, these paste wax compositions would have to be poured into packaging containers in a series of steps: pouring an amount that would cool before phase separating, allowing the poured material to cool and solidify, and pouring again, until the container was filled. This step-wise process is time consuming from a manufacturing standpoint. Thus, there also exists a need for wax compositions that does not phase separate when in a liquid state, and that can be poured into a packaging container in a single step process, without experiencing gross phase separation.

SUMMARY OF THE INVENTION

The present invention relates to wax compositions having improved physical and performance properties, including "hand," detergent resistance (durability), "hardness," and "rub-out" properties. An aspect of the invention relates to a wax composition that is not an oil in water emulsion. The wax composition comprises a wax component and a copolymer. The copolymer comprises an organic backbone having a pendant aliphatic group, a pendant fluorinated group, and a pendant polydiorganosiloxane group. The pendant polydiorganosiloxane group can have the general formula:

(1)

wherein

Y is a divalent linking group, for example, alkylene, arylene, alkarylene, or aralkylene of 1 to 30 carbon atoms and incorporating e.g., ester, amide, urethane, urea groups;

R is hydrogen, lower alkyl (e.g., from 1 to 4 carbon atoms, methyl, ethyl, or propyl), aryl (e.g., from 6 to 20 carbon atoms, phenyl or substituted phenyl), or alkoxy (preferably lower alkoxy of 1 to 4 carbon atoms);

Z is a monovalent polydiorganosiloxane moiety having a number average molecular weight of at least about 500, and is essentially unreactive under copolymerization conditions;

m is an integer from 1 to 3;

n is 0 or 1;

The copolymer preferably comprises a polymeric (meth)acrylic backbone comprising the above-described pendant groups connected to the backbone directly or through a linking group, and having general formula I:

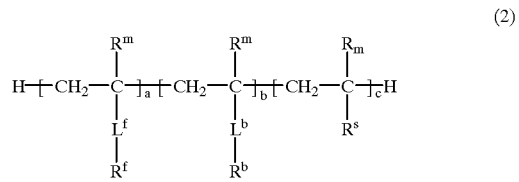
(2)

wherein:

each $R^m$ is independently either hydrogen or methyl;

$L^f$ is a covalent bond or a divalent linking group such as an organic linking group having from 1 to 10 carbon atoms, for example an alkylene group, an ester group such as an alkyl ester, and is preferably a divalent linking group comprising a sulfonamidoester;

$R^f$ is a fluorinated group such as a fluoroalkyl or fluoroalkoxy group, preferably having from about 1 to 20 carbon atoms, and preferably being perfluorinated;

$L^b$ is a covalent bond or a divalent linking group preferably having from about 1 to 5 carbon atoms, and optionally incorporating an ester, an amide, or a urethane;

$R^b$ is a monovalent aliphatic group such as an alkyl group, preferably having from 1 to 12 carbon atoms, more preferably from 1 to 8 carbon atoms;

$R^s$ comprises a pendant polydiorganosiloxane group as defined above, and having the general formula:

(1)

a is in the range from about 0.1 to 10 percent, and preferably from about 1 to 5 of the total a+b+c;

b is in the range from about 40 to 99.8 percent of the total a+b+c; and c is in the range from about 0.1 to 50, percent of the total a+b+c.

The Copolymer can preferably be prepared by free radical copolymerization reactions between an aliphatic (meth) acrylate monomer, e.g., a (meth)acrylic acid ester of an alkyl alcohol; a fluorinated (meth)acrylate monomer, e.g., a (meth)acrylic acid ester and a fluorinated compound, preferably a perfluorinated compound; and a polydiorganosiloxane (meth)acrylate monomer, e.g., a (meth)acrylic acid ester of a polydiorganosiloxane compound.

Yet another aspect the present invention relates to a method of protecting a substrate from sources of environmental damage. The sources of environmental damage can include for example, sunlight, rain and acid rain, water spotting, road tar, tree sap. According to the method a substrate having a surface is coated with a continuous layer of the wax composition. The method comprises the steps of providing a substrate, and coating the substrate with the above-described wax composition.

The present invention also relates to a wax composition that contains an alkoxylated wax that comprises a wax material such as a natural wax, having poly(alkoxy) groups attached to the wax molecules at one or more of a free alcohol group, a free acid group, or an olefinic group. The alkoxylated wax can preferably be prepared by reacting a wax material with an alkylene oxide, such as by reacting a carnauba wax with ethylene or propylene glycol, to attach poly(alkoxy)groups at free alcohol, free acid, or olefinic group within the carnauba wax. The alkoxylated wax of the present invention provides a wax composition that does not phase separate during processing. The alkoxylated wax acts to compatibilize the wax composition, preventing phase separation of the different ingredients of the wax composition. Because the wax does not phase separate, there is no need for the usual precautions taken during processing to prevent the wax composition from phase separating. For instance, the wax composition can be poured into packaging containers in a single pour instead of filling a container in a series of pouring and cooling steps.

As used in the present description, "paste" refers to a substance that is macroscopically solid at room temperature and that readily yields under pressure.

"(Meth)acrylate" refers to both acrylate and methacrylate groups, monomers, or polymers, etc.

"Substrate" refers to surfaces of motor vehicle (e.g., cars, trucks, snowmobiles, motorcycles, etc.) or boat finishes, that can be made of, for example, fiberglass, plastics, and metals, and that can also be coated with a paint finish.

DETAILED DESCRIPTION

The wax composition of the present invention comprises a wax component and a copolymer (referred to herein as the "Copolymer"). The Copolymer comprises an organic backbone and a pendant aliphatic group, a pendant fluorinated group, and a pendant polydiorganosiloxane group. The Copolymer, with its different pendant groups, performs several functions within the wax composition.

The pendant aliphatic group allows the Copolymer to be compatible with other components of the wax composition, for example with other components that are organic or aliphatic in nature, including the wax component. The pendant aliphatic group also provides adhesion between the Copolymer and a substrate. Chemical interaction (e.g., hydrogen bonding) between the aliphatic group and a substrate provides adhesion of the Copolymer to the substrate. The improved adhesion between the Copolymer and the substrate provides a wax composition having useful durability properties, for instance improved resistance to detergents and mechanical wear.

The aliphatic group can be any aliphatic group that will promote adhesion between the wax composition and a substrate, and that will allow the Copolymer to be compatible with other components of a wax composition. Preferably, the pendant aliphatic group is an alkyl group having from 1 to 12 carbon atoms, more preferably from 1 to 8 carbon atoms. In general, increasing the chain length of the aliphatic group improves the adhesion of the Copolymer to a substrate. The aliphatic group can be bonded directly to the backbone of the Copolymer through a covalent bond, or can be bonded to the backbone through a divalent linking group. Preferred divalent linking groups include polar linking groups such as ester, amide, or urethane groups.

The pendant aliphatic group can be present in the Copolymer in any amount that will provide suitable adhesion and compatibility properties. If the proportion of aliphatic group is too low, coatings of the wax composition may not exhibit desired durability properties. Preferred amounts of pendant aliphatic groups have been found to be in the range from about 40 to 99.8 percent of the total of pendant aliphatic, fluorinated, and polydiorganosiloxane groups of the Copolymer.

The pendant fluorinated group imparts desired stain resistance properties to the wax composition of the present invention. More specifically, the pendant fluorinated group provides the wax composition with water and oil repellency. The pendant fluorinated group can be chosen based on the ability to impart a desired level of oil and water repellency to the composition. Fluorinated groups that have been found to be useful include fluoroalkyl groups, fluoroalkoxy groups, perfluoroalkyl and perfluoroalkoxy groups, preferably having from 1 to 20 carbon atoms. The skeletal chain of the fluorinated group can be straight, branched, or if sufficiently large, cyclic, and can include catenary divalent oxygen atoms or trivalent nitrogen atoms bonded only to carbon atoms. Preferably, the fluorinated group is fully fluorinated (perfluorinated), but carbon-bonded hydrogen atoms can be present as substituents on the skeletal chain provided that no more than one hydrogen atom is present for every two carbon atoms in the skeletal chain, and further provided that the fluorinated group contains at least a terminal perfluoromethyl group. While fluorinated groups containing a larger number of carbon atoms will function adequately, groups containing not more than about 14 carbon atoms are preferred. Most preferably, the fluorinated group comprises an average of about 6 to 10 carbon atoms.

The fluorinated group can be attached directly to the backbone of the Copolymer, i.e., through a covalent bond, or it can be attached through a divalent linking group. The linking group can act as a spacer between the Copolymer backbone and the fluorinated group, allowing the fluorinated group to attain a useful orientation within a coating of the wax composition (e.g., at the surface of the coated composition). The linking group is preferably a divalent organic group having from 1 to 10 carbon atoms. Preferred examples include alkylene groups and ester groups such as alkyl ester and sulfamido ester groups.

The fluorinated group can be present in an amount that will provide useful stain and oil repellency to the coated wax composition. In general, increasing the concentration of pendant fluorinated groups improves stain and oil repellency. However, above a certain concentration, the amount of further improvement diminishes. Thus, the pendant fluorinated groups generally comprise up to about 10 percent, preferably from about 0.1 to 10 percent, and even more preferably from about 1 to 5 percent of the total pendant aliphatic, fluorinated, and polydiorganosiloxane groups of the Copolymer.

The pendant polydiorganosiloxane group provides water repellency to a coating of the wax composition of the present invention. Preferred pendant polydiorganosiloxane groups have a number average molecular weight of at least 500, with a molecular weight in the range from about 500 to 50,000 being particularly preferred. Copolymers comprising pendant polydiorganosiloxane groups having molecular weights greater than about 50,000 provide compositions that yield durable coatings, but, when prepared using the preferred copolymerization methods described below, monomers comprising these higher molecular weight polydiorganosiloxane groups tend to be incompatible with the other monomers used to produce the Copolymer, and at such high molecular weights, can be difficult to copolymerize. The pendant polydiorganosiloxane group ($R^s$ of formula 1) can preferably have the general formula:

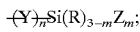

wherein
Y is a divalent linking group, for example an alkylene, arylene, alkarylene, or aralkylene group of 1 to 30 carbon atoms and optionally incorporating e.g., an ester, an amide, a urethane, or a urea group;
R is hydrogen, a lower alkyl (e.g., from 1 to 4 carbon atoms, methyl, ethyl, or propyl), aryl (e.g., from 6 to 20 carbon atoms, phenyl or substituted phenyl), or alkoxy group, preferably a lower alkoxy of 1 to 4 carbon atoms,
m is from 1 to 3;
n is 0 or 1; and
Z is a monovalent polydiorganosiloxane moiety having a number average molecular weight of at least about 500, and is essentially unreactive under copolymerization conditions. Preferred Z groups include those of the general formula:

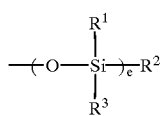

(3)

where $R^1$ and $R^3$ are independently lower alkyl, aryl, or fluoroalkyl groups, where lower alkyl and fluoroalkyl both refer to alkyl groups having from one to three carbon atoms and where aryl refers to phenyl or substituted phenyl of up to 20 carbon atoms. $R^2$ may be alkyl (of 1 to 20 carbon atoms), alkoxy (of 1 to 20 carbon atoms), alkylamino (of 1 to 20 carbon atoms), aryl (of up to 20 carbon atoms), hydroxyl, or fluoroalkyl (of 1 to 20 carbon atoms), and e is an integer from about 3 to about 700.

Polydiorganosiloxane groups can be present in the Copolymer in any amount that will provide desired water repellency properties to a coating of the wax composition. Preferably, the pendant polydiorganosiloxane groups are incorporated in the Copolymer in an amount from about 0.01 to about 50 percent of the total pendant aliphatic, fluorinated, and polydiorganosiloxane groups of the Copolymer.

The pendant aliphatic, fluorinated, and polydiorganosiloxane groups of the Copolymer work together to provide a wax coating having desired adhesion, and desired oil, water, and stain repelling properties. While wishing not to be bound by theory, the pendant polydiorganosiloxane groups are thought to "bloom" to the surface of a coating of the wax composition. At the surface of the coating, the polydiorganosiloxane groups are able to exhibit their maximum effectiveness in repelling water. Migration of the polydiorganosiloxane groups to the surface of the coating coincidentally results in a stratification of the coating, causing an increased concentration of the aliphatic groups below the surface of the coating. This means that while the polydiorganosiloxane groups are concentrated at the surface of the coating where they are most effective in repelling water, the aliphatic groups are positioned below the coating surface, where these groups can most effectively promote adhesion between the coating and the substrate. Thus, each of the aliphatic and polydiorganosiloxane groups of the Copolymer are believed to become situated within the coating in positions that allow each group to most effectively enhance the adhesion and water repelling properties of the wax coating. Fluorinated groups of the Copolymer are believed to be present at the surface of the coating, in small concentrations, to provide stain repellency.

The Copolymer of the present invention can be prepared by known free radical polymerization methods involving the reaction of ethylenically unsaturated monomers. Preferably, the Copolymer is produced by reacting at least three separate reactive monomers comprising: at least one monomer comprising an ethylenically unsaturated group and an aliphatic group; at least one monomer comprising an ethylenically unsaturated group and a fluorinated group; and at least one monomer comprising an ethylenically unsaturated group and a polydiorganosiloxane group. The monomers used to produce the Copolymer can be terminally functional monomers having a single functional group (e.g., a reactive group such as an ethylenically unsaturated group such as a vinyl group or a (meth)acrylic group). Copolymers can preferably be prepared from ingredients comprising an aliphatic (meth) acrylate monomer, a fluorinated (meth)acrylate monomer, and a polydiorganosiloxane (meth)acrylate monomer.

Examples of useful aliphatic (meth)acrylate monomers include (meth)acrylic acid esters of alkyl alcohols having from 1 to 12 carbon atoms, preferably from 1 to 8 carbon atoms, with a preferred average number of carbon atoms being from about 4 to 12. Also preferably, non-tertiary alcohols are used. Examples of useful monomers include (meth)acrylic acid esters of methanol, ethanol, 1-propanol, 2-propanol, 1-butanol, 1,1-dimethyl ethanol, 2-methyl-1-propanol, 1-pentanol, 2-pentanol, 3-pentanol, 2-methyl-1-butanol, 3-methyl-1-butanol, 2-hexanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, and 1-dodecanol, and the like. Preferred aliphatic (meth)acrylate monomers include methyl(meth)acrylate, isobutyl(meth)acrylate, isooctyl (meth)acrylate, isopentyl(meth)acrylate, 2-ethylhexyl(meth) acrylate isononyl(meth)acrylate, octadecyl(meth)acrylate, and mixtures thereof.

Preferred amounts of the aliphatic (meth)acrylate monomer can be in the range from about 40 to about 99.8 percent of the total aliphatic, fluorinated, and polydiorganosiloxane monomers used to produce the Copolymer.

Representative examples of fluorinated monomers include (meth)acrylic acid esters of the following compounds:
dihydroperfluoroalkanols (4) and homologs (5):

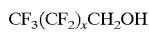 (4)

where x represents an integer from 0 to 20;

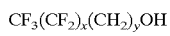 (5)

where x represents an integer from 0 to 20 and y represents an integer from 1 to 10;

ω-hydrofluoroalkanols:

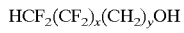 (6)

where x represents an integer from 0 to 20 and y represents an integer from 1 to 10;

fluoroalkylsulphonamido alcohols:

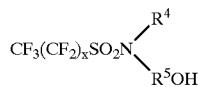 (7)

where x represents an integer from 0 to 20, $R^4$ is selected from the group consisting of alkyl groups comprising 1 to 20 carbon atoms, arylalkyl groups comprising 1 to 20 carbon atoms, hydrogen, and cycloalkyl groups of 3 to 6 ring carbon atoms; and $R^5$ is an alkylene group comprising 1 to 20 carbon atoms;

perfluorocyclo dihydro alkyl alcohols:

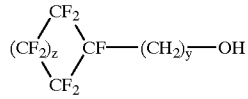 (8)

wherein z represents an integer from 0 to 10, preferably 0 to 7; and y represents an integer from 1 to 10;

and fluoroether alcohols having general formulas 9 and 10:

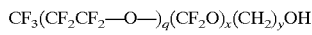 (9)

wherein q represents an integer from 2 to 20 and greater than x; x represents an integer from 0 to 20; and y represents an integer from 1 to 10; and wherein the q and x subunits are randomly distributed;

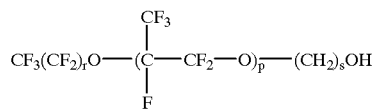 (10)

wherein p represents an integer of at least 1, preferably 1 to 4, s represents an integer of at least 1, preferably 1 to 8, and r represents an integer from 1 to 6.

Specific examples of preferred fluorinated (meth)acrylate monomers include the following:

 (11)

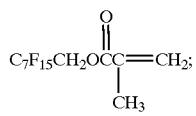 (12)

 (13)

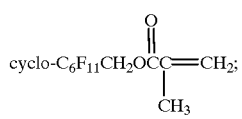 (14)

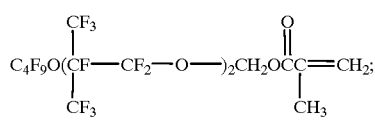 (15)

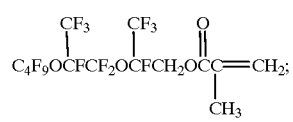 (16)

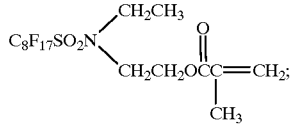 (17)

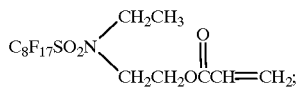 (18)

 (19)

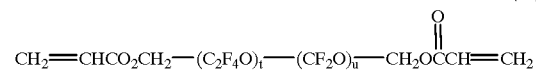 (20)

wherein t represents an integer from 1 to 20, and u represents an integer from 0 to 20, and wherein the t and u subunits are randomly distributed,

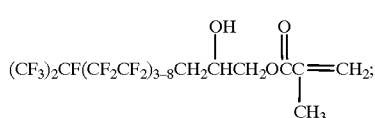 (21)

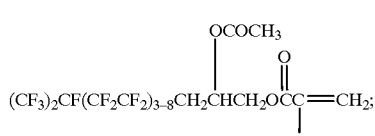 (22)

-continued $$CF_3CF_2(CF_2CF_2)_{2-8}(CH_2CH_2)_2OCCH=CH_2; \quad (23)$$

$$(CF_3)_3C(CF_2CF_2)_2CH_2CH_2OCCH=CH_2; \quad (24)$$

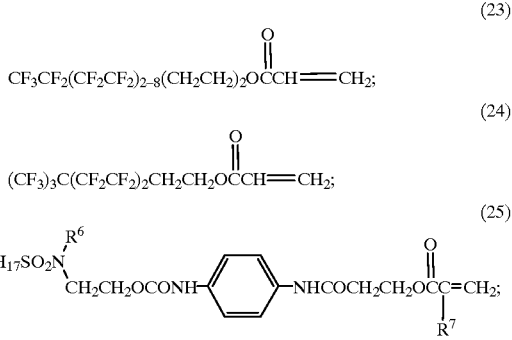
(25)

wherein $R^6$ is methyl or ethyl, and $R^7$ is hydrogen or methyl.

Preferred amounts of fluorinated monomer have been found to be in the range up to about 10 percent, more preferably from about 0.1 to 10 percent, and even more preferably from about 1 to 5 percent of the total aliphatic, fluorinated, and polydiorganosiloxane monomers used to produce the Copolymer.

The polydiorganosiloxane monomers used to prepare the Copolymer can be terminally functional monomers or polymers having a single reactive functional group (e.g., vinyl, ethylenically unsaturated, or (meth)acrylic), sometimes termed macromonomers or "macromers," and having the general formula:

(26)

wherein X is an ethylenically unsaturated group such as a (meth)acrylate, and Y, R, Z, n and m are as defined above. Preferred polydiorganosiloxane monomers used to prepare the Copolymer include:

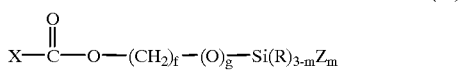
(27)

(28)

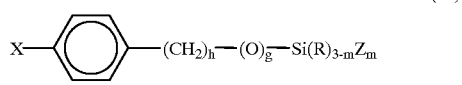
(29)

(30)

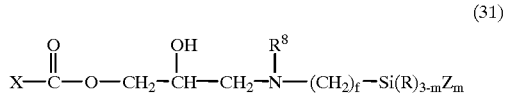
(31)

(32)

wherein g is zero or 1, $R^8$ may be hydrogen or alkyl (preferably of 1 to 10 carbon atoms), f is an integer from 2 to 6, h is an integer from zero to 2, and m, X, R, and Z are as defined above.

Polydiorganosiloxane monomers such as those described above are known, and may be prepared by methods described, for example, in U.S. Pat. Nos. 3,786,116 and 3,842,059. The preparation of polydimethylsiloxane macromonomer and subsequent copolymerization with other terminally functional monomers has been described in several papers by Y. Yamashita et al., *Polymer J.* (14), 1982, p 913; *ACS Polymer Preprints* 25 (1), 1984, p 245; & *Makromolecular Chemie* (9), 1984, p 185. Further discussion of siloxane macromer preparation is provided in U.S. Pat. No. 4,972,037 (Garbe et al.), which is incorporated herein by reference. This method of macromonomer preparation involves the anionic polymerization of diorgano cyclosiloxane monomers to form living polymer of controlled molecular weight. Termination of the reaction is achieved via chlorosilane compounds containing a polymerizable vinyl group. Free radical copolymerization of the monofunctional siloxane macromonomer with vinyl monomer(s) provides siloxane-grafted copolymers of well-define structure, i.e., controlled length and number of grafted siloxane branches.

Suitable monomers for use in the above mentioned anionic polymerization include, in general, diorganocyclosiloxanes of the formula:

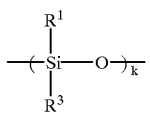
(33)

where $R^1$ and $R^3$ are as previously defined, and where k is an integer from 3 to 7. Preferred are the cyclic siloxanes where k is 3 or 4 and $R^1$ and $R^3$ are both methyl. These cyclic siloxanes being hereinafter designated $D_3$ and $D_4$ respectively. $D_3$, which is a strained ring structure, is especially preferred.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds include ethylsodium, propylsodium, phenylsodium, butylpotassium, actylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the general formula:

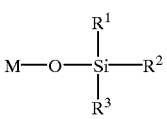
(34)

where M is an alkali metal, tetraalkylammonium, or tetraalkylphosphonium cation, and where $R^1$, $R^2$, and $R^3$ are as previously defined. The preferred triorganosilanolate initiator is lithium trimethylsilanolate (LTMS). In general, the preferred use of both strained cyclic monomer and lithium initiator reduces the likelihood of redistribution reactions and thereby provides siloxane macromonomer of narrow molecular weight distribution, and that is reasonably free of unwanted cyclic oligomers.

Molecular weight of the macromer can be controlled by the initiator/cyclic monomer ratio, and thus the amount of initiator may vary from about 0.004 to about 0.4 mole of organometallic initiator per mole of cyclic monomer. Preferably, the ratio will be from about 0.008 to about 0.04 mole of initiator per mole of cyclic monomer.

The initiation of the anionic polymerization can preferably take place in an inert, preferably polar organic solvent. Anionic polymerization propagation with lithium counterion requires either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about −50.0° C. to about 100° C., preferably from about −20.0° C. to about 30.0° C. Anhydrous conditions and an inert atmosphere such as nitrogen, helium, or argon are required.

Termination of the anionic polymerization can be achieved via direct reaction of the living polymeric anion with halogen-containing termination agents, e.g., functionalized chlorosilanes, to produce vinyl-terminated polymeric monomers. Such terminating agents may be represented by the general formula

$$X(Y)_nSi(R)_{3-m}Cl_m;\qquad(35)$$

where m, X, Y, n, and R are as previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Yamashita et al., the reaction mixture may be ultrasonically irradiated after addition of the terminating agent in order to enhance functionality of the macromonomer. Purification of the macromonomer can be effected by addition of methanol.

The amount of polydiorganosiloxane monomer used to prepare the Copolymer may vary depending upon the water repellency and durability properties desired of coatings of the wax compositions. Preferred amounts of polydiorganosiloxane monomer have been found to be in the range from about 0.01 to 50 percent of the total aliphatic (meth)acrylate, fluorinated, and polydiorganosiloxane monomers used to produce the Copolymer.

Copolymerization of the above described aliphatic (meth) acrylate, fluorinated, and polydiorganosiloxane monomer can be carried out by conventional free radical polymerization, such as described by Ulrich, U.S. Pat. No. Re. 24,906. The above described monomers can be dissolved in an inert organic solvent and polymerized using a suitable free radical initiator which can be either thermally or photochemically activated. Suitable thermally activated initiators include azo compounds such as 2,2'azobis (isobutyronitrile), hydroperoxides such as tertbutyl hydroperoxide, and peroxides such as benzoyl peroxide or cyclohexanone peroxide. Suitable photochemically activated initiators include benzophenone, benzoin ethyl ether, and 2,2-dimethoxy-2-phenyl acetophenone. The amount of initiator used is generally about 0.01 to about 5% by weight of the total polymerizable composition.

The organic solvent used in the free radical copolymerization can be any organic liquid that is inert to the reactants and product, and that will not otherwise adversely affect the reaction. Suitable solvents include ethyl acetate, a mixture of ethyl acetate and toluene, heptane, and mixtures of heptane, toluene, and isopropyl alcohol. Other solvent systems may also be used. The amount of solvent can generally be about 30 to 80 percent by weight of the total weight of reactants and solvent. It should be noted that in addition to solution polymerization, the Copolymer can be prepared by other well-known techniques such as suspension, emulsion, and bulk polymerization. For instance, one alternative technique involves performing a polymeric backbone such as a poly (meth)acrylic backbone, and therefore attaching the above-described pendant groups. For example, the preformed backbone can be copolymerized with cyclic siloxane monomer, or grafted with a preformed monofunctional siloxane polymer, to provide a pendant polydiorganosiloxane group. These and other polymer grafting techniques are described by Noshay and McGrath in *Block Copolymers*, pages 13–16 (1977), and in greater detail by Battaerd and Tregear in *Graft Copolymers*, (1967). Pendant fluorinated groups and aliphatic groups can also be attached to a preformed polymeric backbone by known methods.

Fluorinated silicone acrylate copolymers useful in the present invention are also commercially available, for example, from the Minnesota Mining and Manufacturing Company (3M). An especially preferred Copolymer is 3M Brand Silicone "Plus" SA 70-5 Copolymer, also known as the ASF (Acrylic Silicone Fluoropolymer) Polymer.

The Copolymer can be present in the wax composition of the present invention in any amount that provides useful water repellency, stain resistance, durability properties, etc. Preferred amounts of Copolymer in the wax composition have been found to be in the range from about 4 to 21 parts by weight Copolymer, based on 100 parts by weight of the wax composition (as used herein, the phrase "wax composition" stated in terms of parts by weight of materials therein refers to the Copolymer, the wax component, other silicone materials, plus any solvent).

The wax component of the composition can generally be any of various natural or synthetic, viscous or solid heat-sensitive substances, consisting essentially of high molecular weight hydrocarbons or esters of fatty acids, and being characteristically insoluble in water, but soluble in most organic solvents. The wax component provides desired hardness, rub-out, and hand properties to the wax composition, and allows the wax composition to "bind" a solvent, i.e. solvent is bound or trapped within the wax phase, permitting rub-out that yields a high gloss, streak and smear free finish. Any of the wax materials known in the wax art can be used, and preferably the wax composition contains a blend of two or more waxes. Waxes that have been found to be useful include, synthetic waxes, natural waxes such as animal and vegetable waxes, mineral waxes, and micro-crystallized, oxidized, or chemically modified derivatives thereof Examples of animal waxes include spermaceti, beeswax, wool, Chinese insect wax, and shellac wax. Examples of vegetable waxes include carnauba, candelilla, palm, bayberry, jojoba, sugar cane wax, ricebran, flax, peat, Japan, ouricury, and ceresine. Examples of synthetic waxes include ethylenic polymers, polyether esters, and chlorinated naphthalenes, etc. Examples of mineral waxes include paraffin; polyethylene, montan, ozocerite, petrolatum, etc. Paraffin waxes are derived from straight-chain hydrocarbons with 26–30 carbon atoms per molecule. Microcrystalline waxes are derived from branched-chain hydrocarbons having 41–50 carbon atoms per molecule. Montan waxes are preferred in practicing the invention. An especially preferred montan wax is LP Wax available from American Hoechst Corp., Industrial Chemicals Division.

One preferred wax is natural carnauba wax, which can comprise a mixture of esters of $C_{24}$ and $C_{28}$ normal fatty acids; $C_{32}$ and $C_{34}$ n-alcohols; ω-hydroxy acids, $HO(CH_2)_xCOOH$, where x is 17–29; and smaller amounts of esterified α,ω-diols, $HO(CH_2)_yOH$, where y is 22 to above 28 (see Noller, *Chemistry of Organic Compounds* p. 206 (Third ed. 1966)). Natural carnauba wax is further known to contain amounts of cinnamic aliphatic diester, Lactides, and hydrocarbons (see Kirk-Othmer Encyclopedia of Chemical Technology, Volume 24, page 469, (Third ed., 1985)).

Selected waxes can be alkoxylated by reaction of free alcohols, olefinic groups, and acids contained therein with alkoxylating agents such as alkylene oxides (e.g., ethylene oxide, propylene oxide, etc., or combinations thereof), to produce a wax that comprises polymerized alkoxy groups attached to molecules of the wax. Alkoxylation of wax molecules occurs through ring-opening polymerization reactions that are well known in the polymer art. For example, the chemistry and mechanisms of ring-opening polymerization are discussed in detail in *Ring-Opening Polymerization* (Volumes 1, 2 & 3) edited by K. J. Ivin and T. Saegusa, 1984, and more generally in M. P. Stevens, *POLYMER CHEMISTRY an Introduction* pp. 346–351, 360–368 (Second ed., 1990). The kinetics of ring-opening polymerization chemical reactions are described in G. G. Odian, *Principles of Polmerization* pp. 535–558 (Third ed., 1991). The alkylene oxide compound chosen to be reacted onto the wax, as well as the chain length of the resulting poly(alkoxy) groups, can be chosen to provide desirable properties for the wax composition (e.g., for rub-out, hand, softness, etc.).

Natural carnauba wax can be alkoxylated by reacting the free alcohol group, the acid group, or the olefinic group of the cinnamic aliphatic diester with alkylene oxide. Some of the crystalline esters (comprising the major component of carnauba wax) can also be cleaved during the reaction and the resulting acids and alcohols also react with alkylene oxide during the alkoxylation process, increasing the yield of alkoxy adducts. The free acids, alcohols, olefinic groups, and that fraction of the esters that are cleaved can be referred to as "ring-opening initiating groups". A portion of the alkylene oxides can also be hydrolyzed to the corresponding glycols which then react with additional alkylene oxide to form a minor amount of water extractable polyalkylene glycol oligomer.

As an example of the production of an alkoxylated wax, natural carnauba wax (100 parts by weight) can be reacted with about 25 parts by weight of a mixture of ethylene oxide (EO) and propylene oxide (PO) (preferably in a weight ratio in the range from 90:10 to 99:1, for example about 95:05) to attach a poly(alkoxy) group at ring-opening initiating groups. Preferably the resulting poly(alkoxy) group can be comprised of an average of about eleven EO/PO polymerized monomeric units. EO/PO modified carnauba wax of this type is commercially available from Koster Keunen, Inc., of Watertown, Conn.

Alkoxylated carnauba wax is a preferred wax component because alkoxylated carnauba wax has been found to be softer than natural carnauba wax and provides an improved "feel" or "hand" to a wax composition, and also because an alkoxylated carnauba wax provides desired phase stability to a wax composition. The improved phase stability provides an advantage in processing the wax composition. Because these wax compositions will not phase separate when in a liquid state, precautions of preventing phase separation of the liquid wax composition are not required. As a result the wax composition comprising alkoxylated carnauba wax can be poured into a packaging container in a single step without waiting for the composition to cool and solidify, and the composition will not phase separate.

The wax component can be present in the wax composition in any amount that will provide desired hardness, rub-out, and hand properties. Preferred amounts of wax component have been found to be in the range from about 11 to 42 parts by weight wax component based on 100 parts wax composition. The wax component can contain any amount (i.e., from 0 to 100 parts by weight) of alkoxylated wax, but it is preferred that from about 30 to 90 percent by weight of the wax component is an alkoxylated wax such as the above-described EO/PO modified carnauba wax.

The wax composition of the present invention can also contain a solvent which can soften the composition to form a readily applicable paste having a desired feel or "hand," and that can be easily spread onto a substrate. Some types of hydrocarbon solvents can also aid in dissolving and removing small amounts of road tar and greasy residues from the vehicle surface as the wax composition is applied, thereby acting as a cleaner. After application to a substrate, the solvent component of the wax composition evolves away to leave the remaining components of the wax composition, including the wax and the Copolymer. Suitable solvents include aliphatic hydrocarbon liquids such as mineral spirits, naphtha, Stoddard solvent, kerosene, and dipentene; cycloaliphatic hydrocarbons; aromatic hydrocarbons such as naphtha or small amounts of toluene or xylene; and terpenes such as pine oil and turpentine.

The solvent can be present in the wax composition in any amount that will provide a useful balance of the above-described properties. Sufficient solvent should be present to allow enough time after application to fully rub-out the composition before it dries. However, if too much solvent is used, the wax composition tend to become smeary, and if to little solvent is present, the wax composition can become too hard Preferred amounts of solvent have been found to be in the range from about 40 to 80 parts by weight solvent based on 100 parts by weight of the wax composition.

Silicone fluids are preferably added to the wax composition to aid rub-out by acting as a lubricant. Specific examples of silicone fluids include polydimethylsiloxane (PDMS), preferably having a viscosity in the range from about 50 to 100,000 centistoke, more preferably from 100 to 30,000 centistoke, and most preferably about 350 centistoke. Preferred amounts of silicone fluid have been found to be in the range from about 4 to 13 parts by weight silicone fluid based on 100 parts by weight of the wax composition.

The wax composition of the present invention may also contain other ingredients known to be useful in the production of wax compositions, including fragrances, water beading additives, pigments, mild abrasives, dyes, ultraviolet stabilizers, antioxidants, water, surfactants, thickeners, and preservatives.

For some applications, small amounts of micro-abrasives may be added to the compositions to aid in removal of thin damaged layers in the paint finish, for example when the finish is severely hazy or otherwise damaged by exposure to solar radiation. Examples of suitable mild abrasives include diatomaceous earth, alumina, aluminum silicate, various clays, amorphous silica, crystalline silica, pumice, Garnet, and microcrystalline silica.

Preferred embodiments of the invention can contain fragrances that mask the residual odor of hydrocarbon solvents.

Water bead enhancers can be added to the wax compositions to control the appearance and size of water beads on freshly waxed surfaces. Water bead enhancers that have been found to be useful include blends of polyethylene waxes and micronized poly(tetrafluoroethylene) such as, Aquabead 519, available from Micro Powders Inc., Tarrytown, N.Y.

The above ingredients can be combined to produce the wax composition of the present invention by well known methods. In general, the solvent component is heated to a temperature sufficient to melt the wax component. The wax component is then dispersed into the solvent. Once the wax component is dispersed in the solvent, there is no further need to heat the composition. The temperature of the composition can be reduced to a temperature in the range from about 65 to 70° C., and the remaining ingredients, including the Copolymer, can then be mixed into the solvent/wax dispersion. The completed wax composition can then be reduced to a temperature that will allow pouring of the wax composition without coagulation, (e.g., about 65° C.) and poured into a packaging container.

In a preferred embodiment of the present invention, comprising the above-described alkoxylated carnauba wax, the wax composition does not phase separate at elevated temperatures. Thus, the heated processing steps can be undertaken without taking precautions to prevent phase separation of the composition while the composition is in its liquid state. For example, there is no need to pour the liquid composition into a packaging container in multiple steps.

The invention will now be described by the following non-limiting examples.

EXAMPLES

Solvent paste wax Sample 1 and a Comparative Example 1, each having the compositions shown in Table 1, were prepared by adding the odorless mineral spirits and isoparaffinic solvent (Isopar™ M from Exxon Corp.) to an appropriately sized container. While stirring, the solvent mixture was heated to 85 to 90° C. When the mixture reached temperature, the silicone fluid (Masil™ SF 350, from PPG Mazer Chemicals, Gurnee, Ill.), Montan wax (Hoescht LP Wax, from Hoescht Celanese Corp., Somerville N.J.), alkoxylated carnauba wax (PEG Carnauba Wax from Koster Keunen, Inc., Watertown Conn.), and water beading additive (Aquabead 519 from Micro Powders Inc., Tarrytown, N.J.) were added. The addition of these components reduced the temperature out of the target zone (85 to 90° C.). With further heating, the temperature of the composition rose back to 85 to 90° C., and the wax composition was stirred for about 15 minutes to assure complete mixing of the solid components of the composition and to produce a homogeneous product. During mixing, the temperature was maintained in the range from 85 to 90° C. The composition was allowed to cool until the temperature was in the range from about 65 to 70° C., whereupon the Copolymer (SA-70 from 3M Corp.) and fragrance (Pina Colada, from Andrea Aromatic, Princeton N.J.) were added. The composition was mixed for about 10 additional minutes to completely incorporate these final components into the solvent paste wax composition.

The Comparative Example 1 paste wax composition was made using the same procedure except the alkoxylated carnauba wax was replaced with natural (non alkoxylated) carnauba wax.

TABLE 1

|  | Sample 1 | Comparative Example 1 | Comparative Example 2 |
| --- | --- | --- | --- |
| Odorless Mineral Spirits | 33.5 | 33.5 | 33.5 |
| Isoparaffinic Hydrocarbon Solvent | 33.5 | 33.5 | 33.5 |
| Silicone Fluid | 8.0 | 8.0 | 8.0 |
| Montan Wax | 6.7 | 6.7 | 6.7 |
| Carnauba Wax | none | 11.3 | none |
| Modified Carnauba Wax | 11.3 | none | 11.3 |
| Water Bead Additive | 2.3 | 2.3 | 2.3 |
| Copolymer (having pendant groups) | 4.5 | 4.5 | none |
| Fragrance | 0.20 | none | 0.20 |

*Percentages are weight percent unless stated otherwise.

The Sample 1, Comparative Example 1, and Comparative Example 2 paste wax compositions were evaluated for ease of application, including the subjective properties of hardness, rub-out, and streaking. The waxes were applied to gel-coat polyester resin clad foam core panels representative of state-of-the-art foam core composites commercially used to manufacture pleasure boats, obtained from the Johnson Boat Works, White Bear Lake, Minn. The panels were cleaned with 3M General Purpose Adhesive Cleaner (#8982) and allowed to dry. Four coats of wax were applied to a single panel, each coating being applied by the steps of: spreading a film of the wax on the panel, allowing the freshly applied wax coating to dry and harden for about twenty minutes; wiping the wax off the panel with a paper towel; and allowing each newly applied wax coating to stand for fifteen minutes before applying the next coating.

The Sample 1 and Comparative Example 2 paste waxes were soft and had a consistency that permitted easy transfer of the wax to a rag for application to the test panels. When applied, the wax rubbed out without flaking or streaking to provide a uniform coating which was easily polished to high gloss. The Comparative Example 1 paste wax composition was hard in the container and had a consistency that permitted transfer of only small amounts of wax to a rag for application to the test panels. When applied and rubbed out the Comparative Example 1 paste wax composition produced a streaked coating, and portions of the coating came off of the test panels in flakes.

Durability was tested of the Sample 1 wax composition and a commercially available paste wax composition (Comparative Example 3 was Collonite 885, Special Heavy Duty Fleetwax (from Collonite Corporation of Utica N.Y.), which chemical analysis showed to contains non-alkoxylated carnauba wax, odorless mineral spirits, and a silicone fluid. Four coats of each wax were applied to one of the above-described gel coated panels. Contact angles were measured at three locations on each of the waxed panels using a VCA-2000™ Video Contact Angle System for Surface Analysis, available from Advance Surface Technology Inc., Billerica, Mass. An eight microliter drop of deionized water was metered onto the waxed panel surface using a syringe. A five point curve fitting algorithm was used to calculate the contact angles of the water droplet on the waxed panel surface. Each panel was then washed with five grams of a ten weight percent solution of 3M Multi-Purpose Boat Soap (#9034) in deionized water. The panels were scrubbed by pushing and pulling a paper towel across the waxed surface of each panel forty times (the forty scrub strokes constituting one wash cycle of the durability test). The paper towel was held against the waxed surface using a 3.6 kilogram weight. Upon completion of the wash cycle, the soap was removed from the waxed surface by rinsing the panel with running tap water. The panels were dried with a paper towel and the contact angle measurement repeated. Contact angle was measured over fifty wash cycles and the results are reported in Table 2.

TABLE 2

| Number of Washes | Comparative Example 3 | Sample 1 |
|---|---|---|
| 0 | 103.7 | 99.5 |
| 1 | 95.5 | 91.8 |
| 2 | 94.2 | 90.3 |
| 3 | 91.0 | 89.2 |
| 4 | 92.3 | 87.5 |
| 5 | 86.8 | 87.7 |
| 6 | 87.2 | 88.7 |
| 7 | 87.8 | 85.3 |
| 8 | 87.5 | 86.7 |
| 9 | 84.3 | 90.8 |
| 10 | 85.7 | 84.2 |
| 11 | 82.7 | 84.5 |
| 12 | 84.0 | 84.5 |
| 13 | 77.5 | 82.8 |
| 14 | 77.8 | 82.3 |
| 15 | 80.7 | 77.3 |
| 16 | 82.5 | 83.5 |
| 17 | 82.8 | 79.5 |
| 18 | 83.3 | 82.3 |
| 19 | 72.0 | 71.3 |
| 20 | 78.7 | 79.8 |
| 21 | 76.3 | 76.2 |
| 22 | 78.0 | 78.0 |
| 23 | 77.3 | 81.3 |
| 24 | 81.0 | 77.5 |
| 25 | 77.3 | 80.5 |
| 26 | 73.8 | 70.0 |
| 27 | 75.3 | 78.5 |
| 28 | 68.0 | 70.3 |
| 29 | 73.8 | 75.3 |
| 30 | 77.8 | 73.3 |
| 31 | 73.2 | 73.3 |
| 32 | 80.0 | 77.3 |
| 33 | 78.7 | 77.8 |
| 34 | 75.5 | 77.8 |
| 35 | 75.2 | 76.0 |
| 36 | 74.8 | 74.7 |
| 37 | 74.0 | 76.7 |
| 38 | 76.7 | 76.7 |
| 39 | 74.7 | 76.2 |
| 40 | 73.0 | 77.3 |
| 41 | 74.7 | 76.2 |
| 42 | 74.3 | 76.8 |
| 43 | 76.2 | 80.3 |
| 44 | 73.5 | 77.3 |
| 45 | 75.2 | 77.7 |
| 46 | 72.3 | 72.3 |
| 47 | 69.5 | 75.2 |
| 48 | 67.2 | 69.0 |
| 49 | 67.8 | 72.5 |
| 50 | 70.0 | 73.5 |

The data of Table 2 show that the Sample 1 paste wax composition has improved durability over the wax composition of Comparative Example 3. Contact angle results are significant as to the change in contact angle, not the absolute value of the contact angle. The absolute value of a contact angle can be readily controlled by adding ingredients to the formulation such as a water beading additive. Therefore, the uniformity of contact angle values over time, and/or after a number of washings or exposure to the environment, is an indication of the durability of a wax composition. In Table 2, Sample 1 shows a lower change in contact angle values during the above tests. Therefore, the wax of Sample 1 is more durable than the wax composition of Comparative Example 3.

Weatherability tests were performed on the Sample 1 paste wax and the Comparative Example 3 paste wax composition. Ten sets of eight test panels were waxed with four coats of paste wax using the above described procedure, with the exception that the test panels used were ACT Cold Roll Steel (10×30×0.8 cm), that had been primed and painted with automotive base-coat/clear-coat finish paints available from Advanced Coating Technologies (ACT) Laboratories of Hillsdale, Mich. A set of cleaned, but unwaxed panels were provided as a Control panels. The panels were tested outside, in Miami, Fla., and according to ASTM G 7 with open back racks angled at 45° from horizontal. One set of panels was stored in the laboratory and allowed to age indoors. The test panels were weathered for two weeks, one month, two months, etc., with the final set of panels being aged for five months.

After exposure, each panel was cleaned using ten grams of the 10 percent solution of 3M Multi Purpose Boat (#9034) a paper towel. The panels were rinsed with tap water to completely remove the detergent, and dried with a paper towel prior to measuring the contact angle (by the procedure described above). Contact angles were also remeasured on the retained set of test panels aged indoors. The results are shown in Table 3.

TABLE 3

| Months of Weathering | control (no wax) Contract Angle (degrees) | Comparative Example 3 Contact Angle (degrees) | Sample 1 Contact Angle (degrees) |
|---|---|---|---|
| Initial (Dec. 2) | 78.7 | 100.7 | 99.5 |
| ½ | 70.2 | 87.7 | 91.5 |
| 1 (Jan. 2) | 67.7 | 86.8 | 89.8 |
| 2 | 58.5 | 80.0 | 80.2 |
| 3 | 49.2 | 74.7 | 69.5 |
| 4 | 51.3 | 67.2 | 66.7 |
| 5 | 51.0 | 54.2 | 56.2 |

Table 3 shows that Sample 1 has improved weatherablility over Comparative Example 2. In Table 3, Sample 1 shows a lower change in contact angle values during above tests. Therefore, the wax of Sample 1 is more durable than the wax position of Comparative Example 3.

What is claimed is:

1. A wax composition comprising:

a wax component; and a copolymer comprising an organic backbone and:
   a pendant aliphatic group;
   a pendant fluorinated group, and
   a pendant polydiorganosiloxane group having the formula

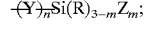

wherein

Y is a divalent linking group;

R is hydrogen, alkyl, aryl, or alkoxy;

Z is a monovalent polydiorganosiloxane moiety having a number average molecular weight of at least about 500;

n is zero or 1;

m in is an integer of from 1 to 3; and the wax composition is not an oil in water emulsion.

2. The wax composition of claim 1, wherein the copolymer has the formula:

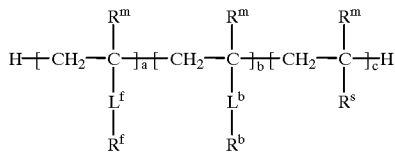

wherein:

each $R^m$ is independently either hydrogen or methyl;

$L^f$ is a covalent bond or a divalent linking group chosen from the group consisting of an alkylene group, an alkylene ester group, and a sulfonamidoester, of from 1 to 10 carbon atoms;

$R^f$ is a fluoroalkyl, fluoroalkoxy, perfluoroalkyl, or perfluoroalkoxy group having from 1 to 20 carbon atoms;

$L^b$ is a covalent bond or a divalent linking group having from about 1 to 5 carbon atoms, and optionally incorporating an ester, an amide, or a urethane;

$R^b$ is an aliphatic group having from 1 to 12 carbon atoms, $R^s$ is a polydiorganosiloxane group of the formula:

wherein

Y is a divalent linking group chosen from the group consisting of alkylene, arylene, alkarylene, and aralkylene of 1 to 30 carbon atoms and optionally incorporating an ester, amide, urethane, or urea group;

a is in the range from about 0.1 to 10 percent of the total a+b+c;

b is in the range from about 40 to 99.8 percent of the total a+b+c;

c is in the range from about 0.1 to 50 percent of the total a+b+c.

3. The wax composition of claim 2, wherein the Z group has the formula:

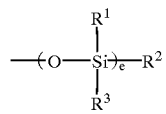

where $R^1$ and $R^3$ are independently alkyl having from one to three carbons, aryl, or fluoroalkyl groups, $R^2$ is alkyl, alkoxy, alkylamino, aryl, hydroxyl, or fluoroalkyl, and e is an integer from about 3 to about 700.

4. The wax composition of claim 1, wherein the copolymer is derived from mutually free radically copolymerizable monomers comprising an aliphatic (meth)acrylate monomer, a fluorinated (meth)acrylate monomer, and a polydiorganosiloxane monomer.

5. The wax composition of claim 4, wherein the aliphatic (meth)acrylate monomer is selected from the group consisting of isobutylmethacrylate, isooctylacrylate, isopentylmethacrylate, methylmethacrylate, 2-ethylhexylacrylate, isononylmethacrylate, and mixtures thereof.

6. The wax composition of claim 4, wherein the fluorinated (meth)acrylate monomer is selected from the group consisting of:

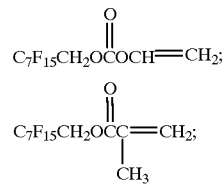

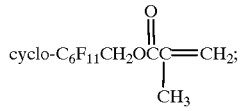

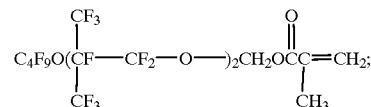

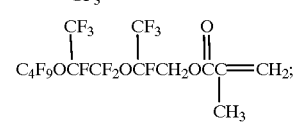

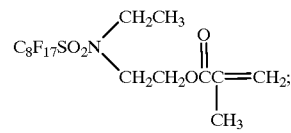

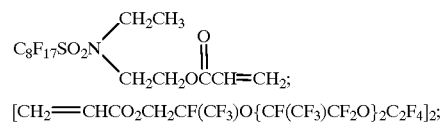

$[CH_2\!=\!CHCO_2CH_2CF(CF_3)O\{CF(CF_3)CF_2O\}_2C_2F_4]_2;$ $CH_2\!=\!CHCO_2CH_2\!-\!(C_2F_4O)_t\!-\!(CF_2O)_u\!-\!CH_2O\overset{O}{\overset{\|}{C}}CH\!=\!CH_2$ wherein t represents an integer from 1 to 20, and u represents an integer from 0 to 20, and wherein the t and u subunits are randomly distributed;

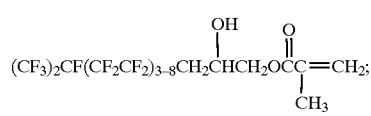

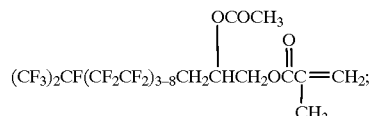

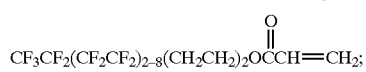

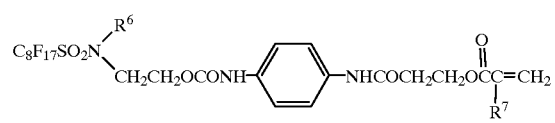

wherein $R^6$ is methyl or ethyl, and $R^7$ is hydrogen or methyl.

7. The wax composition of claim 4, wherein the polydiorganosiloxane monomer has the formula:

wherein X is a (meth)acrylate group.

8. The wax composition of claim 7, wherein the polydiorganosiloxane monomer is selected from the group consisting of:

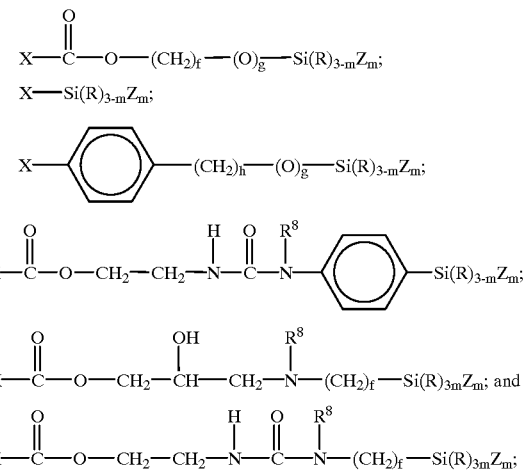

wherein X is a (meth)acrylate group, g is zero or 1, $R^8$ is alkyl of 1 to 10 carbon atoms or hydrogen, f is an integer from 2 to 6, h is an integer from zero to 2.

9. The wax composition of claim 4, wherein the copolymer is derived from ingredients comprising about 0.40 to 99.8 mole percent of the aliphatic (meth)acrylate monomer, from about 0.01 to 10 mole percent of the fluorinated (meth)acrylate monomer, and about 0.01 to 50 mole percent of the polydiorganosiloxane monomer.

10. The wax composition of claim 1, wherein the wax component comprises a wax selected from the group consisting of: carnauba, montan, paraffin, microcrystalline, beeswax, candellia, and mixtures thereof.

11. The wax composition of claim 1, wherein the wax component comprises an alkoxylated wax comprising one or more of a free alcohol group, a free acid group, or an olefinic group that has been reacted with alkylene oxide to attach a poly(alkoxy) group at the free alcohol, the free acid, or the olefinic group.

12. The wax composition of claim 11, wherein the wax component is prepared by reacting natural carnauba wax with alkylene oxide.

13. The wax composition of claim 12, wherein the alkylene oxide comprises one or more of ethylene oxide and propylene oxide.

14. The wax composition of claim 11, wherein the alkoxylated wax is prepared by reacting 100 parts by weight of natural carnauba wax with about 25 parts by weight of a mixture of ethylene oxide and propylene oxide, the ethylene oxide and propylene oxide being present in a weight ratio in the range from 90:10 to 99:1.

15. The wax composition of claim 1, comprising:
from about 4 to 21 parts by weight copolymer;
from about 11 to 42 parts by weight wax component; and
from about 40 to 80 parts by weight solvent.

16. The wax composition of claim 15, wherein the 11 to 42 parts by weight wax component comprises from about 30 to 90 weight percent alkoxylated wax.

17. A method of protecting a substrate from environmental damage, the method comprising the steps of:

providing a substrate having a surface;
coating said surface with a wax composition comprising:
a wax component, and
a copolymer comprising an organic backbone and:
a pendant aliphatic group;
a pendant fluorinated group, and
a pendant polydiorganosiloxane group having the formula

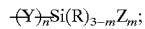

wherein

Y is a divalent linking group;

R is hydrogen, alkyl, aryl, or alkoxy;

Z is a monovalent polydiorganosiloxane moiety having a number average molecular weight of at least about 500;

n is zero or 1;

m is an integer of from 1 to 3; and the wax composition is not an oil in water emulsion.

18. The method of claim 17, wherein the copolymer has the formula:

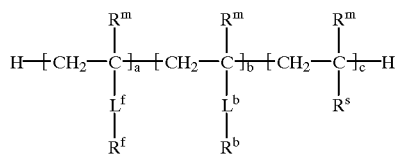

wherein:

each $R^m$ is independently either hydrogen or methyl;

$L^f$ is a covalent bond or a divalent linking group chosen from the group consisting of an alkylene group, an alkylene ester group, and a sulfonamidoester, of from 1 to 10 carbon atoms;

$R^f$ is a fluoroalkyl, fluoroalkoxy, perfluoroalkyl, or perfluoroalkoxy group having from 1 to 20 carbon atoms;

$L^b$ is a covalent bond or a divalent linking group having from about 1 to 5 carbon atoms, and optionally incorporating an ester, an amide, or a urethane;

$R^b$ is an aliphatic group having from 1 to 12 carbon atoms, $R^s$ is a polydiorganosiloxane group of the formula:

wherein

Y is a divalent linking group chosen from the group consisting of alkylene, arylene, alkarylene, and aralkylene of 1 to 30 carbon atoms and optionally incorporating an ester, amide, urethane, or urea group;

a is in the range from about 0.1 to 10 percent of the total a+b+c;

b is in the range from about 40 to 99.8 percent of the total a+b+c;

c is in the range from about 0.1 to 50 percent of the total a+b+c.

* * * * *